(12) United States Patent
Jensen et al.

(10) Patent No.: US 7,054,374 B1
(45) Date of Patent: May 30, 2006

(54) DIFFERENTIAL SIMULTANEOUS BI-DIRECTIONAL RECEIVER

(75) Inventors: Richard S. Jensen, Aloha, OR (US); David S. Dunning, Portand, OR (US); Kenneth Drottar, Portland, OR (US); Chamath Abhayagunawardhana, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 09/752,813

(22) Filed: Dec. 29, 2000

(51) Int. Cl.
*H04B 3/00* (2006.01)
*H04L 25/00* (2006.01)

(52) U.S. Cl. ........................ 375/257; 375/220

(58) Field of Classification Search ................ 375/257, 375/340, 219, 220, 222; 379/399.02, 402, 379/405, 414, 416, 417
See application file for complete search history.

(56) References Cited

U.S. PATENT DOCUMENTS 4,004,109 A * 1/1977 Boxall ........................ 379/405
4,203,012 A * 5/1980 Boxall ........................ 379/405
4,300,023 A * 11/1981 Kelley et al. ................ 379/405
5,333,194 A * 7/1994 Caesar ........................ 379/402
6,236,696 B1 * 5/2001 Aoki et al. .................. 375/376

* cited by examiner

*Primary Examiner*—Phuong Phu
(74) *Attorney, Agent, or Firm*—Erik M. Metzger

(57) ABSTRACT

When signaling over cables or other media having significant return impedance, it is generally more efficient to use two conductors to carry two simultaneous bi-directional signals differentially, rather than utilizing unidirectional communications. Bi-directional communications increases the aggregate bandwidth of a pair of conductors. A conversion circuit converts unidirectional signaling between an edge-based receiver and a transmitter to simultaneous differential bi-directional signaling. A receiver for receiving data includes an edge processor operative to make decisions using edges of a received data stream and a communication circuit coupled to the edge processor. The communication circuit is operative to convert communications with the edge processor from a first format, such as unidirectional signaling, to a second format, such as differential bi-directional signaling.

21 Claims, 13 Drawing Sheets

Data with no Jitter

Data with Jitter

*High Level Block Diagram of Edge Based Receiver*

Edge Buffer Block Diagram

Timing Diagrams for the Edge Pipelines

*Edge Processing Block Diagram*

*Synchronizer Timing Diagram*

*Phase Picking Mechanism Block Diagram*

| Signals | A | A# | B | B# | A+B | A#+B# | High Out |
|---|---|---|---|---|---|---|---|
| Actual Volt. | 1.0V | 0.5V | 0.25V | -0.25V | 1.25V | 0.25V | + |
| | | | -0.25V | 0.25V | 0.75V | 0.75V | - |
| | | | 0.05V | -0.05V | 1.05V | 0.45V | + |
| | | | -0.05V | 0.05V | 0.95V | 0.55V | - |
| | | | 0V | 0V | 1.0V | 0.5V | tie |
| | 0.5v | 1.0v | 0.25V | -0.25V | 0.75V | 0.75V | + |
| | | | -0.25V | 0.25V | 0.25V | 1.25V | - |
| | | | 0.05V | -0.05V | 0.55V | 0.95V | + |
| | | | -0.05V | 0.05V | 0.45V | 1.05V | - |
| | | | 0V | 0V | 0.5V | 1.0V | tie |

FIG. 15

DIFFERENTIAL SIMULTANEOUS BI-DIRECTIONAL RECEIVER

FIELD OF THE INVENTION

The invention relates generally to methods and apparatuses for receiving data, and more particularly to a method and apparatus for receiving data in a noisy environment, such as a server.

BACKGROUND OF THE INVENTION

Two basic data receiver architectures are prevalent in the communications and computer industries today: tracking receivers and oversampling receivers.

Tracking Receivers

In brief, a tracking receiver employs a phase locked-loop (PLL) based architecture that in operation, compares the phase of received data with a local clock phase and modulates the frequency of the local clock to correspond with the frequency and phase of the incoming data. A tracking receiver therefore tracks the frequency of the received data so that the tracking can reliably receive the data. By tracking the frequency of the received data, the receiver can tolerate phase and amplitude jitter that may be present in the received waveform due to multiple noise sources. An alternate implementation of a tracking receiver employs a delayed-lock loop (DLL), which serves a similar function as the PLL.

Oversampling Receiver

An oversampling receiver does not require a PLL or DLL but instead operates by obtaining a series of samples of the received data and filtering out noise based on the history of the sampled data. The samples taken by an oversampling receiver are at a frequency that is some multiple (e.g., three times) of the nominal frequency (i.e., without phase and amplitude jitter) of the received data. By taking so many samples of the received data, the transmitted signal can be determined without having to modulate the clock frequency of the receiver.

Both tracking and oversampling receivers have some drawbacks. Tracking receivers require analog circuits that are sensitive to noise. Often the designs of tracking receivers are large and/or need additional power to function correctly in integrated circuits that contain a large amount of high frequency digital logic circuitry, such as a microprocessor, memory controller or I/O (input/output) bridge. Extreme care must be taken when laying out a circuit board for a receiver that includes very sensitive analog circuits (i.e. a phase-locked loop circuit) and very high speed digital logic, which draws down the voltage rails very quickly, causing large noise sources. Consequently circuit designers employ various techniques to lessen the impact of these noise sources on the sensitive analog circuits. These techniques however, often result in increased circuit costs (both in size and investment).

In general, over-sampling receivers contain a much higher percentage of digital circuitry than tracking receivers, and therefore should be more tolerant of noise sources. However, the rate at which over-sampling receivers sample the incoming waveform introduces an additional source of jitter, often called quantization jitter, which reduces the noise budget in the transceiver/channel subsystem. As the rate of oversampling is at least three times the data rate, the speed of the digital logic limits the overall speed of the communication process to a much lower rate than otherwise possible using a tracking receiver. Consequently, very high-speed receivers employ PLL circuits to enable operation of the receiver at a level much nearer to the limit of the digital circuitry, than that which could be accomplished with oversampling.

The invention is therefore directed to the problem of developing a digital receiver that can operate at the speed of the digital circuitry, yet does not require sensitive analog circuits.

BRIEF DESCRIPTION OF THE DRAWINGS

FIG. 15 is a table that charts possible input voltages and the results of their summation in the absence of a conversion circuit according to yet another aspect of the invention.

DETAILED DESCRIPTION

Figure 1:
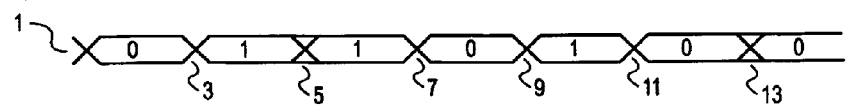
FIG. 1 depicts a differentially encoded data stream without jitter.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One embodiment of the invention includes an edge-based receiver to overcome the problems associated with both tracking and oversampling receivers. In an edge-based receiver, high-speed communication is accomplished without the use of analog circuitry and the concomitant noise and other limitations associated with the use of analog circuitry.

An edge based receiver bases decisions regarding received data on edges detected in a received waveform. The edge-based receiver operates by detecting "zero crossings" or edges of the input data waveform. Zero crossings are those time instances where two differential signals cross each other, i.e., when the amplitudes of the two differential signals are equal and are transitioning from one state to another. An edge signals a change in the transmitted bit as well as the absence of any data changes since the last edge. By examining the edges of the received waveform, and when they occur, the receiver effectively reconstructs the transmitted bits synchronous relative to a local clock. In other words, the receiver operates without requiring knowledge of the transmitter's clock. The reconstructed waveform is then decoded in the normal manner. This methodology eliminates the need for analog circuitry, such as Phase Locked Loops (PLLs) and phase tracking mechanisms outlined earlier, thereby enabling a higher speed, noise insensitive receiver and faster data communication.

In high-speed data communications, it is common for a transmitter and receiver to communicate uni-directionally such as in, for example, a Serialize/Deserialize (SERDES) operation. When signaling, however, over cables or other media with significant return impedance, it is usually more efficient to use two conductors to carry two simultaneous bi-directional signals differentially rather than to carry two single-ended signals that invariably will generate significant amounts of signal-return crosstalk.

Other embodiments of the invention relate to an asynchronous receiver architecture that avoids the above-described design problems of prior art tracking and oversampling receiver architectures—noise sensitivity and quantization jitter—by using one or more of the following techniques: detecting edges (i.e., zero crossings) of the received waveform, using a local clock (or multiple phases of a local clock) to track the transmitted bit clock, comparing the edge arrival time to the transmitted bit clock, and determining whether each edge arrived early or late relative to its expected arrival time, and using this determination in the receiver decision process.

The architecture of the receiver of the embodiments of the invention is superior to a tracking architecture because it does not require a phase or delay locked-loop based structure, specifically the noise sensitive circuits of a voltage-controlled oscillator (VCO), a phase detector and a loop filter. The embodiments of the invention are also superior to an over-sampling receiver because they do not introduce quantization jitter because they detect the edges based on the rate of the received data rather than using a local oscillator, thus increasing the noise budget by that amount of time. The embodiments of the invention are additionally superior to an over-sampling receiver because they are not limited in the rate at which they can received data, because of the need to run at a higher-multiple clock rate than the received data.

Edge-Based Receiver

Referring to FIG. 1, a data sample 1 without jitter (e.g., the data sample prior to transmission) is depicted. In this example, the data sample consists of a data stream of bits (0110100) formed of differentially encoded signals, in which the positive signal takes a positive value when depicting a "1" and the negative signal takes a negative value when depicting a "1" and vice versa when depicting a "0". Zero crossings of these signals (i.e., the point where the signal value changes) are shown at 3, 7, 9 and 11. The "phantom" zero crossings 5, 13 shown in dotted lines represent a point in time when the data bits end, but no change in signal actually occurs because the previous bit is the same as the succeeding bit. Consequently, there is no zero crossing or edge transition at this time.

Figure 2:
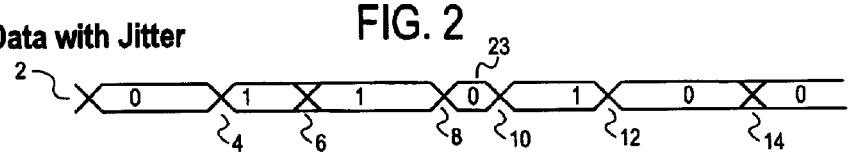
FIG. 2 depicts the differentially encoded data stream of FIG. 1 after transmission through a noisy channel.

Turning to FIG. 2, the same data sequence 2 is depicted as in FIG. 1, but with jitter (e.g., after transmission through a noisy channel). As evident in FIG. 2, the data bits are extended or shortened in time due to the effects of jitter. For example, the first data bit (0) in FIG. 2 has a "zero crossing" 4 or edge that occurs after the zero crossing 3 in the jitter-free signal in FIG. 1. The opposite can also occur. For example, the second zero 23 in FIG. 2 has an extremely short duration due to the effects of jitter, which delays the start of the edge transition 8 in FIG. 2 relative to when it should have started at point 7 in FIG. 1 and simultaneously moves the edge transition 10 in FIG. 2 up in time relative to when it should have occurred at point 9 in FIG. 1. Consequently, this bit 23 (i.e., the second zero) can be very difficult to detect using an oversampling receiver, as described below.

Figure 3:
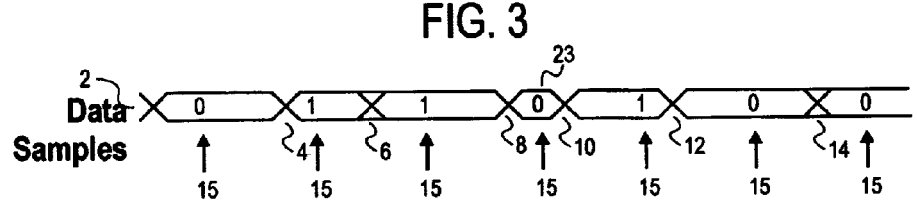
FIG. 3 depicts the data stream of FIG. 2 with jitter indicating the times when a tracking receiver samples the data stream.

Referring to FIG. 3, shown therein is the data waveform of FIG. 2 (with jitter) being sampled using a tracking receiver (such as either a DLL- or PLL-based receiver). The tracking receiver clock attempts to track the transmitted clock in an effort to try and sample the data bits (samples are taken at times 15) at the optimum moment (i.e., when the eye of the signal is at its maximum). If the jitter affects the signal faster than the phase-locked loop (or DLL) can correct the tracking receiver clock or if there is jitter in the tracking PLL (or DLL) due to local noise sources, data samples are corrupted. Although not shown in FIG. 3, such corruption can occur when the sample 15 is taken at one of the transitions 4, 8, 10 or 12.

Figure 4:
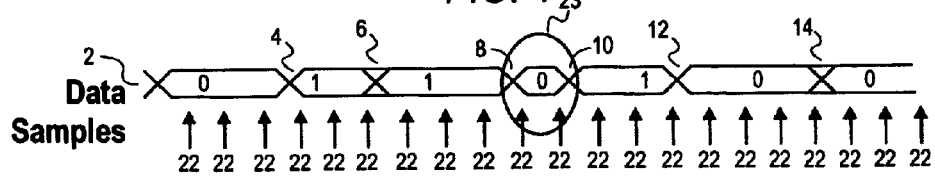
FIG. 4 depicts the data stream of FIG. 2 with jitter indicating the times when an oversampling receiver samples the data stream.

Turning to FIG. 4, shown therein is the data waveform of FIG. 2 (with jitter) being sampled using an oversampling receiver. In this example, the oversampling receiver attempts to sample the incoming data at three times the data rate (samples are taken at times 22). Due to jitter, the oversampling receiver can have difficulty determining how many bits of a repeating bit were transmitted. For example, the two "1s" bounded by zero crossings 4 and 8 are sampled five times and the two "0s" started at zero crossing 12 are sampled at least six times, whereas the short "0" 23 is sampled only once or twice, both of which samples are not definitive, since each bit is ideally identified by three samples. As a result, the oversampled output is 000X11111XX11X000000X, in which "X" represents an indeterminate sample. Note that there is no definitive sample for the short zero 23. Thus, the oversampling receiver has difficulty receiving both long, repeating bits and extremely short bits due to jitter.

An exemplary embodiment includes an edge-based receiver that has a multi-phase clock generator, which runs plesiochronously (i.e., independently) with respect to a transmit clock. The frequency difference between the two clock bases (i.e., the transmit and receiver clocks) is designed to be less than a few hundreds parts per millions. It is also assumed that the data is encoded in such a way that a 180° phase ambiguity of the recovered data waveform, i.e., inverted data, can be resolved completely by the data decoder. One encoding/decoding scheme, referred to as 8B/10B encoding/decoding, commonly used in high-speed serial transmission systems, can tolerate a complete inversion of the bit stream. According to this encoding/decoding scheme, any given 10-bit code word, and its inversion, are both reserved for the same 8-bit input vector. Consequently in combination with the invention, the data sequence can be accurately predicted, despite a potentially resulting 180° phase ambiguity, by only observing the edges of the received waveform.

EXEMPLARY EMBODIMENT

Figure 5:
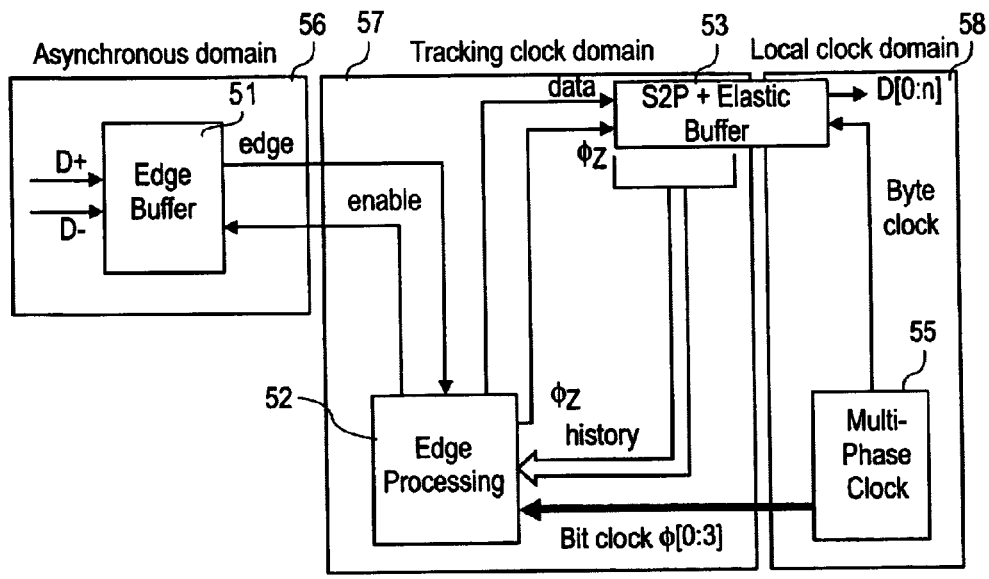
FIG. 5 depicts an exemplary embodiment of an edge-based receiver according to one aspect of the invention in a high-level block diagram format.

A high-level block diagram of an exemplary embodiment of the receiver is shown in FIG. 5. In this exemplary embodiment, the receiver 50 functionality is divided into three main sections, i.e., the edge buffer 51, the edge processing 52 and the multi-phase clock generator 55. The exemplary embodiment 50 includes an edge buffer 51, an edge processor 52, an elastic buffer 53 and a multi-phase clock 55. The edge buffer 51 receives the coded transmission signal, which in this embodiment is a differentially encoded signal. The edge signals produced by the edge buffer 51 are forwarded from the edge buffer 51 to the edge processor 52 upon receipt of an enable signal from the edge processor 52. The edge processor sends the data and a recovered clock $\phi_z$ to the elastic buffer 53, out of which the data is clocked. The multi-phase clock 55 provides references to the edge processor 52, which are used to determine the recovered clock $\phi_z$. The data history sent from the elastic buffer 53 is used to determine in the decision process for incoming data.

The exemplary embodiment 50 operates in three time domains—an asynchronous domain 56, a tracking clock domain 57 and a local clock domain 58. In the asynchronous domain 56, the exemplary embodiment operates without knowledge of any clock. In the tracking clock domain 57, the exemplary embodiment tracks the clock inherent in the transmitted data by comparing the edge transitions in the transmitted data to multiple clock references. In the local clock domain 58, the exemplary embodiment operates in accordance with a local clock.

The exemplary embodiment 50 operates by detecting "zero crossings" (also referred to as "edges") of the input transmitted data waveform. As used herein, the term "zero crossings" or edges is used to refer to the start of a new symbol or bit, such as the time instances when two differential input signals cross each other. For a bit encoded using only one signal, the edges or zero crossings refers to the start of the symbol, such as the rising or falling edge of a pulse or turning on and off of a light source. Therefore, an edge or zero crossing signals a change in the transmitted bit as well as the absence of any data changes since the last edge.

To establish the data associated with the received waveform, the data signal is toggled once for every edge detected. Neither the absolute bit signaled nor the initial state of the data signal needs to be known as the uncertainty introduced by this ambiguity is resolved by the encoding/decoding scheme, e.g., 8B/10B encoding/decoding. In effect, the transmitted bits are reconstructed synchronous to a local clock, by just examining at the edges of the received waveform. The local time base tracks the slow variations of the remote (or transmission) clock and the local clock by using a phase picking mechanism. Phase picking is based on the mean zero crossings.

Each of the elements of the exemplary embodiment 50 for use with a differential encoding is described below in more detail.

Edge Buffering Section

Figure 6:
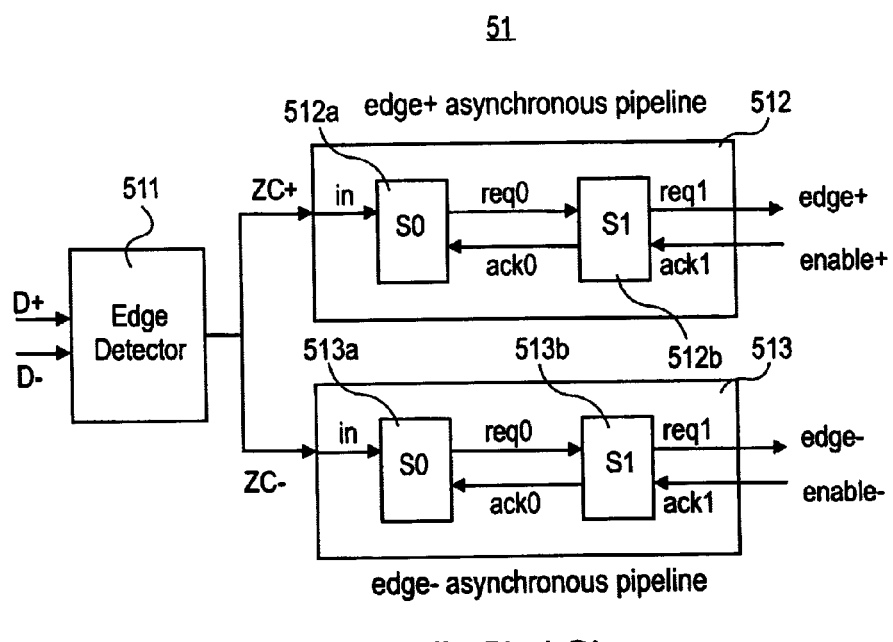
FIG. 6 depicts an exemplary embodiment of an edge buffer in a block diagram format according to another aspect of the invention.

Turning to FIG. 6, the edge buffer 51 of the exemplary embodiment of the receiver 50 includes an edge detector 511 and two self-timed asynchronous pipelines 512, 513 for the polarized edge events, one pipeline for positive transitions and one pipeline for negative transitions. For multi-bit symbols, there should be one pipeline for each type of symbol being employed. This edge buffering section 51 operates asynchronously with respect to local clock, described in more detail below. The receiver stores the occurrences of the edges in the edge pipelines 512, 513 (referred to herein as "edge buffering") and reflects these edges in the reconstructed data (referred to herein as "edge processing").

For proper operation there must be a one-to-one correspondence between the edges occurring on the incoming transmission line and data changes in the reconstructed data stream. In other words, the receiver 50 must not miss any edges in the buffering and subsequent edge processing, and must reflect a given edge in the corresponding bit position. These conditions can be satisfied by using a local clock that is approximately equal (but need not be identical) to the transmit clock, and by using a properly designed edge buffer.

One possible implementation of the edge detector 511 is a high-gain, high-bandwidth comparator, which is capable of amplifying the minimum input signal swings to levels detected by digital CMOS circuits. The edge detector 511 produces differential outputs ZC+ and ZC−. The rising edges of ZC+ and ZC− are used to insert edge events into the edge+ and edge− asynchronous pipelines, respectively.

Figure 7:
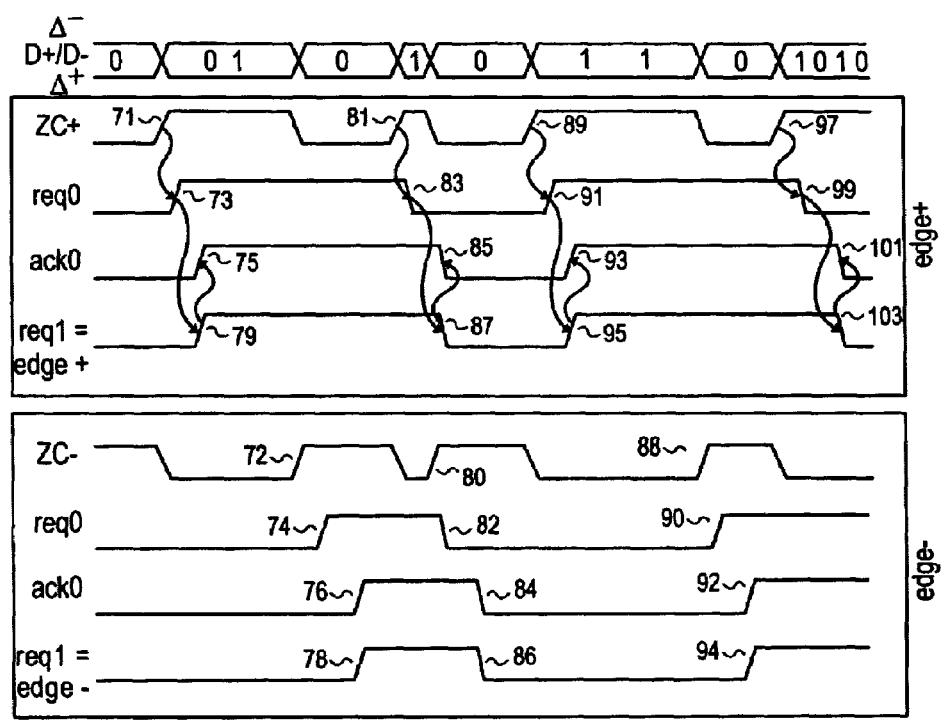
FIG. 7 depicts various signal timing diagrams for the edge pipelines for both polarities of the edge signal.

Turning to FIG. 7, note that the rising edges of the ZC+ (71) and ZC− (72) signals correspond to two distinct types of zero crossings with opposite polarity. The edge pipelines 512, 513 are made long enough to accumulate the maximum number of polarized edges (i.e., only one of each type can occur) that can occur in a single bit time. In the exemplary embodiment it will take one bit time to observe the edge in the edge processor 52. An additional margin of one additional bit storage is provided to accommodate short-term variation of the local clock.

A 2-stage pipeline is sufficient for the purposes of the exemplary embodiment. The input end of the edge pipelines 512, 513 shall be referred to herein as the "tail" of those pipelines, and the output end shall be referred to as the "head" of the pipelines. Note that the two pipelines operate independently of each other. By using two independent pipelines for the polarized zero crossings ZC+ and ZC− the timing constraints can be relaxed on each pipeline, allowing the receiver to buffer edges that occur close together, e.g., lone pulses (such as 23 in FIGS. 2–4).

When an edge with the matching polarity is seen at the input of the pipeline, it propagates this event to the head of the pipeline after a constant delay $\tau_{pi}$. This is achieved through a series of asynchronous requests and acknowledgement signals. A rising edge 71 (FIG. 7) in ZC+ will cause the first stage S0 512a of the edge+ pipeline 512 to latch that event. S0 will then assert its request, req0 and disable its input until the acknowledgement ack0 is received. The second stage S1 512b will notice the toggle on req0 and latch the event. It also produces ack0, re-enabling S0 to latch new events. This action effectively moves the event from the tail of the pipeline to the head. The head of the edge pipeline, S1, toggles the edge+ (or edge−) signal to indicate the presence of stored edges. This signal is used later in edge processing.

The receiver employs a non-return-to-zero (NRZ) scheme to encode both input events (req signals) and the ack signals. This reduces the frequency at which these lines need to toggle. When ZC+ 71 goes positive, the req0 signal goes positive 73. When the req0 signal is received at the second stage 512b, an ack0 signal 75 is sent back to the first stage 512a. The receipt of the req0 signal at the second stage 512b causes the second stage to output the req1 signal after a short delay, but essentially simultaneously with the output of the ack0 signal. Upon receipt of a second zero crossing rising edge in ZC+ at time 81, the req0 signal returns to zero at time 83, causing signals ack0 and req1 to follow at times 85 and 87, respectively. The process repeats at times 91, 93 and 95 for a third rising ZC+ 89 and at times 99, 101 and 103 for a fourth rising ZC+ 97.

The edge– pipeline operates similarly but with respect to rising edges (72, 80 and 88) in the ZC– signal. Rising edges 72, 80 and 88 in ZC– cause changes in req0 (74, 82 and 90, respectively), ack0 (76, 84 and 92, respectively) and req1 (78, 86 and 94, respectively). In FIG. 7, req0 (with changes 72, 80 and 88) and req1 (with changes 78, 86 and 94) represent the outputs of the stages 513a, 513b in the edge– pipeline.

Edge Processing Section

Figure 8:
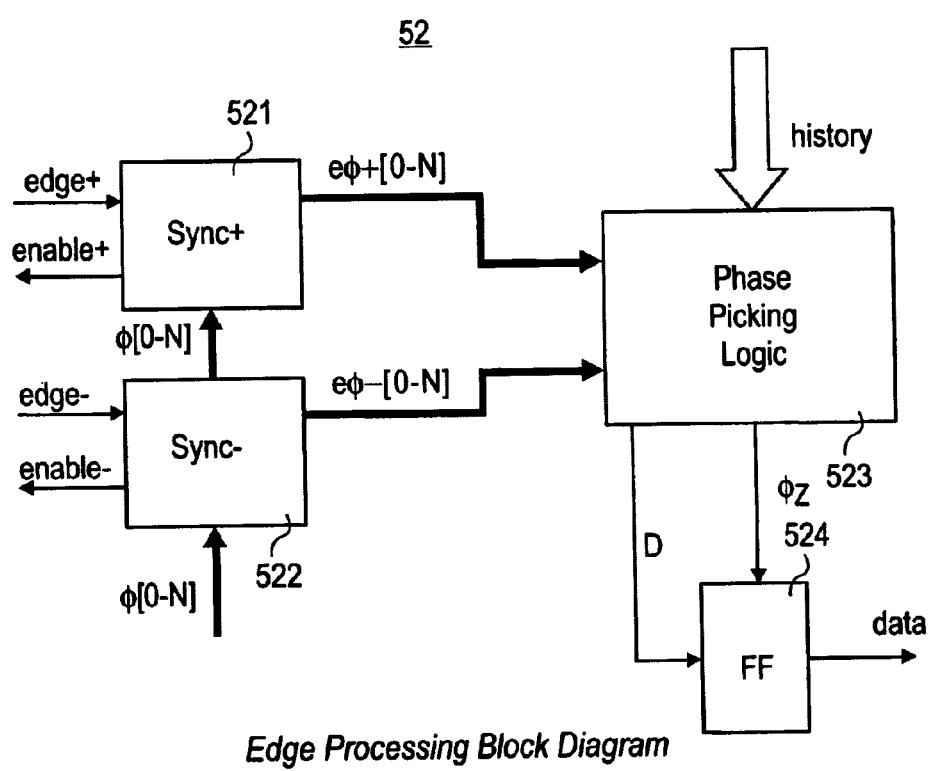
FIG. 8 depicts an exemplary embodiment of an edge processor in a block diagram format according to another aspect of the invention.

FIG. 8 depicts the edge processor 52 in more detail. The edge processor 52 includes two synchronizers 521, 522 (one for each differential signal), phase picking logic 523 and a data toggle block 524.

For proper operation, the receiver 50 requires a clock that is approximately, but not identically, aligned to the transmit clock, both in frequency and phase. Frequency alignment within certain bounds is accomplished by system design, i.e., by properly selecting clocks with sufficiently stable frequencies. To estimate the phase of the transmit clock, a mechanism averages the zero crossings. The phase-picking logic 523 provides an accurate estimate of the bit boundaries to re-create them.

The synchronizer blocks 521, 522 synchronize the edge signals from the asynchronous domain 56 (FIG. 5) to the tracking clock domain 57 (FIG. 5). The phase-picking logic 523 first estimates the zero crossing phase $\phi_z$ by maintaining a moving average of the zero crossing instances, with respect to local clock phases.

Synchronizers

The two synchronizers Sync+ 521 and Sync– 522 interface directly with the respective edge pipelines 512, 513. When an edge is registered at the tail of a pipeline it propagates to the head and will be signaled by a toggle in the corresponding edge signal. The synchronizer 521, 522 will first convert the edge+ and edge– signals into the tracking clock domain 57. However, as a multi-phase clock is used in the edge processor, the edge signals need to be synchronized to all clock phases. In this process, the synchronizer 521, 522 will also identify the first clock phase after the edge signal is toggled. The approximate phase when the edge was noticed at the head of the pipeline is conveyed on the signals e$\phi$[0:n]. Although represented as a single output in FIG. 8, signals e$\phi$[0:n] are composed of multiple signals, e$\phi_0$–e$\phi_3$ in the preferred embodiment, which are reflective of the n multiple reference clock phases. Similarly, although represented as single inputs in FIG. 8, signals $\phi$[0:n] are composed of multiple signals, e$\phi_0$–e$\phi_3$ in the preferred embodiment, which are reflective of the n multiple reference clock phases.

For example, the synchronizer 521, 522 will provide an active high signal for a complete clock period on e$\phi$+[n] signal if a rising edge was noticed approximately at phase $\phi_n$. This signal will be used as a vote for phase $\phi_n$ in the phase picking logic.

Figure 9:
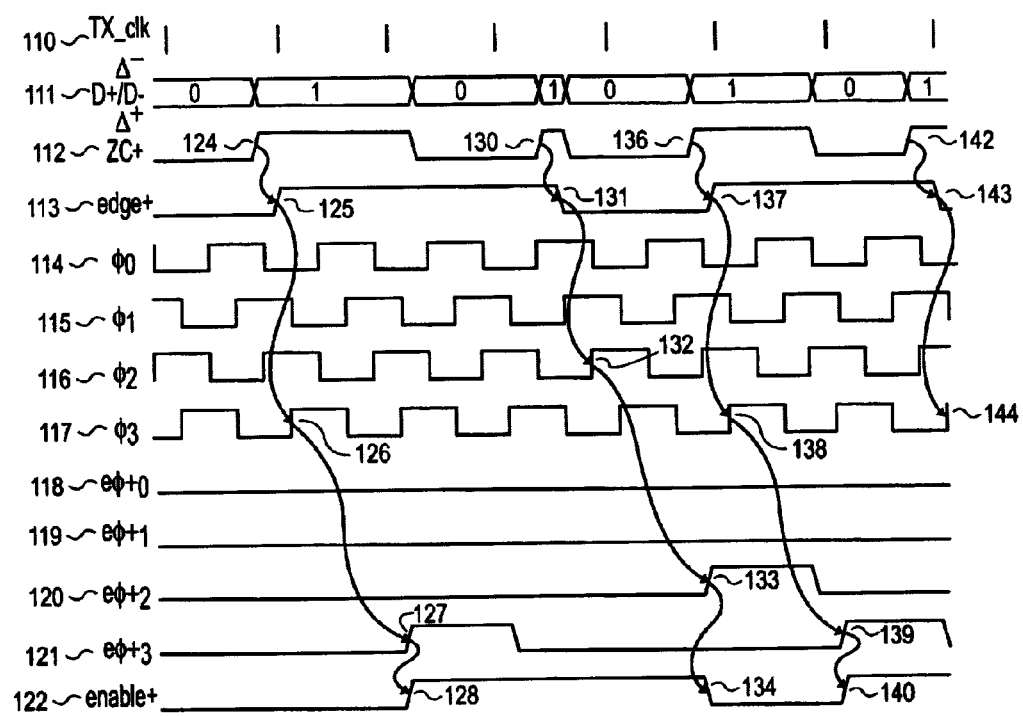
FIG. 9 depicts several timing diagrams of various signals in a synchronizer used in the exemplary embodiment depicted in FIG. 8.

FIG. 9 depicts the synchronizer timing of the exemplary embodiment. Reference 110 indicates the transmitter clock signal, which in the ideal case would align with the received signals 111, but which does not due to noise present in the received signals 111. Reference 112 represents the positive zero crossing signal ZC+. The edge+ signal 113 is received at the synchronizer 521 after a propagation delay through the edge+ pipeline 512. Signals 114–117 represent the four-clock phases output by the multi-phase reference clock 55 to which the edge signals are synchronized. Signals 118–121 represent the outputs of the synchronizer 521, which indicate which of the clock signals lies closest to the zero crossing ZC+. In FIG. 9, clock phase $\phi_3$ 117 has a positive edge 126 occur first after the positive rising edge 125 of the edge+ signal corresponding to the rising edge 124 of ZC+ before any of the other clock phases ($\phi_0$, $\phi_1$, $\phi_2$). Therefore, the output e$\phi$+$_3$ from synchronizer corresponding to clock phase $\phi_3$ has a positive rising edge 127, which lasts for one clock cycle. A second rising edge 130 in ZC+ triggers a rising edge 131 in edge+. The next rising edge 132 of any clock phase occurs in clock phase $\phi_2$. This causes a rising edge 133 in e$\phi$+$_2$ that lasts for one clock cycle causing a falling edge 128. The rising edge 133 in e$\phi$+$_2$ causes a falling edge 134 in the enable+ signal. A third rising edge 136 in ZC+ triggers a rising edge 137 in edge+. The next rising edge 138 of any clock phase occurs in clock phase $\phi_3$. This causes a rising edge 139 in e$\phi$+3 that lasts for one clock cycle. The rising edge 139 in e$\phi$+$_2$ causes a rising edge 140 in the enable+ signal. The process begins again with rising edges 142, 143 and 144.

Data Output Block

The purpose of the data output block 524 is to reconstruct the bit boundaries of the output data waveform. The bit boundaries will be aligned with the current data phase $\phi_z$ provided by the phase picking logic 523. The data line will toggle at $\phi_z$ provided that there is an edge event signaled by the selected edge pipeline.

Phase Picking Mechanism

Figure 10:
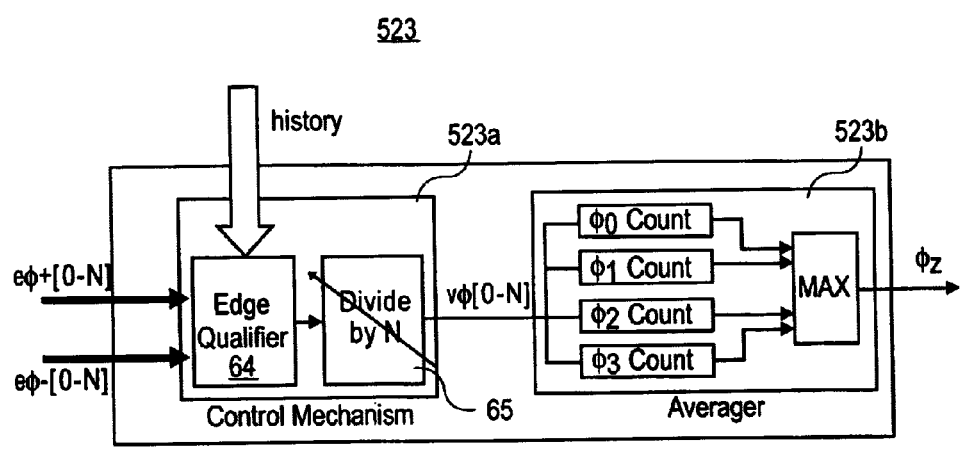
FIG. 10 depicts a block diagram of an exemplary embodiment of a phase-picking mechanism used in the exemplary embodiment of the edge receiver.

Turning to FIG. 10, the phase picking mechanism includes a control mechanism 523a and an averager 523b. The functions of these mechanisms are described below, after a description of the methods used in those mechanisms.

The function of the phase picking logic is to select a new phase for bit boundaries, and to average out the jitter associated with edges. The underlying parameters for the proper phase picking is that temporal information of the zero crossings varies according to the total jitter seen by the receiver. There are some zero crossings that can be relied upon to make new phase selections, while some other zero crossings are affected by excessive jitter. By maintaining a moving average of the zero crossings, the phase picking mechanism tracks the remote clock phase. The total jitter seen by the receiver consists of deterministic jitter introduced by the channel and random jitter, which is primarily caused by the transmitter clock. The random jitter is unpredictable, while the deterministic jitter is data dependent. The architecture described herein uses the data dependent nature of the deterministic jitter to qualify the zero crossings that are used for phase picking, while averaging out the random jitter.

Figure 11:
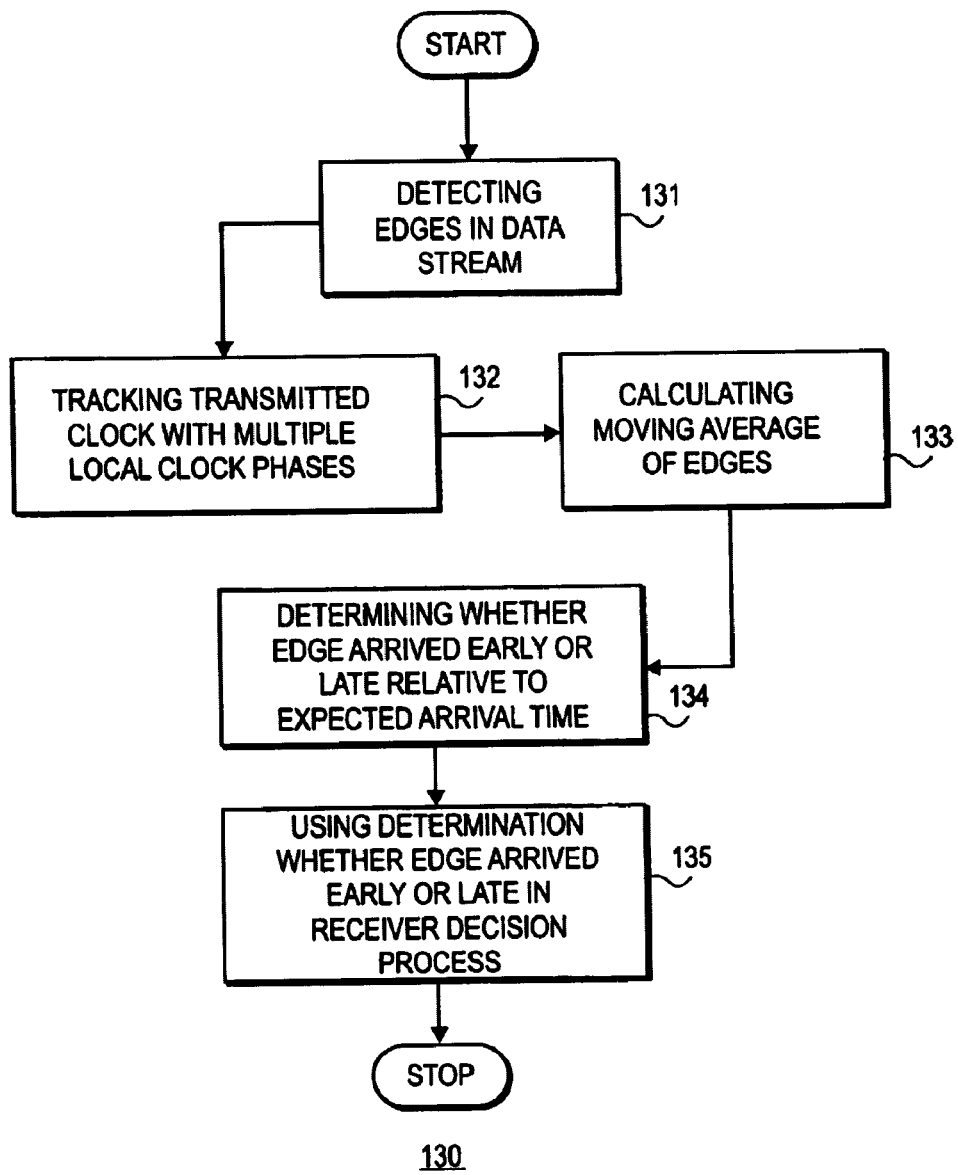
FIG. 11 depicts a flow chart of an exemplary embodiment of a method of the invention.
Figure 12A:
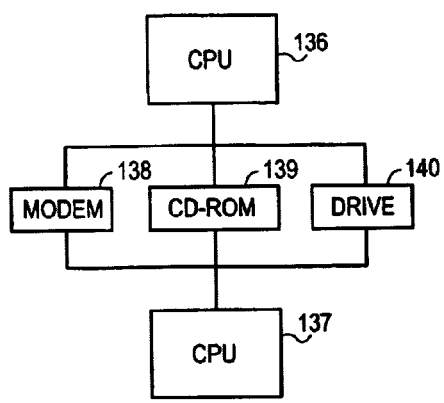
FIGS. 12a–d depicts exemplary embodiments of various systems employing the method and apparatus of the invention
Figure 12B:
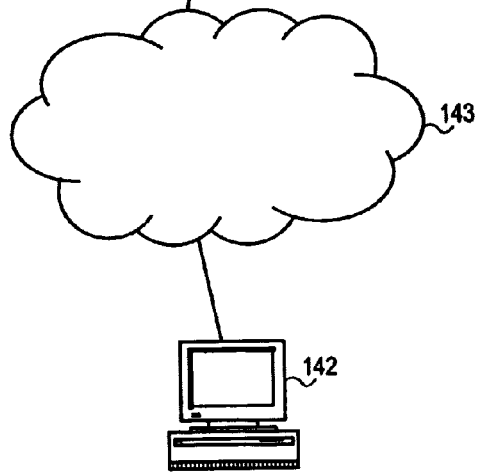
Figure 12C:
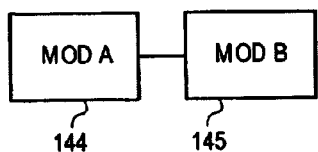
Figure 12D:
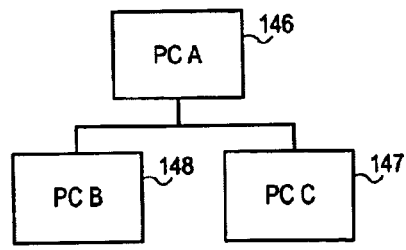

Referring to FIG. 11, shown therein is an exemplary embodiment of a method 130 of the invention. First, the edges are detected (element 131), in the edge buffer 51. The temporal information of the received edges is observed by synchronizing the edges to the multiple (n) phases of a local clock (element 132), in the edge processor 52, specifically the Synch+ and Synch– logic. When an edge arrives, the first phase that observes (or latches) that edge passes the phase (i.e., the temporal) information to the phase picking logic 523. The phase picking logic 523 tracks the transmitted clock frequency by averaging the phases (temporal information) in which the edges arrive (element 133). By keeping a running average of when the edges arrive and using that average as the transmit clock, short term jitter due to random and deterministic noise sources is filtered out, while simultaneously tracking long term drift between the transmitted clock and the receive (local) clock.

When each edge is detected (element 131), the time in which that edge arrives is compared to the expected edge arrival time (element 134). This temporal information is combined with the history of the previous bits that have arrived to determine if the arrived edge is early of late with respect to the transmitted clock. This determination allows the receiver to determine the correct transmitted bit pattern (element 135).

Control Mechanism

The control mechanism used in the exemplary embodiment includes an edge qualifier 64 and a divide-by-N network 65. There are two controls that govern the phase picking. First, in the control mechanism 523a, the zero crossings are screened by the edge qualifier 64 to establish which zero crossings are to be used for the averaging process 523b. Second, the qualified zero crossings are sent through a divide-by-N network 65. By controlling the divide ratio N, the rate at which the new phase decisions are made can be controlled, and the average frequency at which the phase picking logic needs to operate can also be reduced.

Divide by N Block

The divide by N network 65 is a programmable unit, which effectively controls the tracking bandwidth of the receiver. Small values of N will pass more qualified edges into the averager 523b, thus increasing the rate at which the phase history is updated. Faster voting rates may potentially allow the receiver to make new phase decisions more frequently, thereby increasing the tracking bandwidth. Larger values of N will have the opposite effects.

Edge Qualifier

The goal of the edge-based receiver 50 is to minimize the short-term phase tracking and maintain a steady alignment with respect to the mean zero crossings. On the other hand, it should select new phases at a rate sufficient to track the frequency difference between the transmitter and the receiver. One key to accurately estimating the mean zero crossings is averaging. The phase picking logic will include a mechanism (e.g., an averager 523b) to maintain a moving average of the jitter over a sliding window of programmable size. However, to reduce the estimation error associated with the mean zero crossings, the edges associated with the "lone transitions" (e.g., '000001 . . . 'or '111110 . . . ' and related patterns), in the averaging process may be discarded or ignored. This is based on the fact that these edges are biased with excessive deterministic jitter. The edge qualifier logic 64 will provide the mechanism to screen the above-described edges, based on the history of received data.

A programmable control logic circuit 523a is employed to screen the zero-crossings based on five bits of historical data, for example, to be used with 8B/10B encoded data with a run-length of five. As the run length is limited to five bits, the worst-case deterministic jitter can be captured in a period of five bits. The control logic 523a may be set to mask any zero crossings that occur after n or more repeated 1's or 'O's. By programming n, the receiver tracks the phase more closely during alternate symbols i.e., '10101010 . . . ', while being less sensitive to lone transitions, e.g., '000001 . . . ' or '111110 . . . ', and similar patterns.

Averaging

The function of the phase picking logic is to select the best clock phase from the multiple phases generated by the local clock, for the data bit boundaries (zero crossings) being transmitted. A default phase is selected at power-on and the zero crossings will eventually cause the logic to select the closest phase to the transmit clock. During initial acquisition of the phase, the receiver may choose to bypass the divider network (or set N=1), and use all of the qualified zero crossings to make new phase decisions, thereby reducing the acquisition time.

For the purpose of this analysis, the short-term statistical average of a zero crossing shall be referred to as the mean zero crossing. The mean zero crossings may drift over time due to frequency differences between the transmitter and the receiver clocks. Since the local receiver clock is nearly equal to the transmit clock, if the receiver 50 identifies a phase of the local clock which is closest to the mean zero crossings, it can estimate the approximate phase of the remote transmit clock. The accuracy of the estimate of the mean zero crossings depends on the number of distinct clock phases provided by the local clock generator, as well as the phase selection mechanism. With proper design, the magnitude error of the estimation will be upper bounded by $T_b/n$, where $T_b$ is the bit period and n is the number of distinct clock phases. The error in the estimation can be reduced further by adopting mechanisms to average out the zero crossings (i.e., by using averager 523b) and by disqualifying biased zero crossings (i.e., by using programmable control logic circuit 523a) in the averaging process.

The criterion for phase selection is based on averaging the 'qualified' zero crossings. The averager 523b receives the qualified edges via the $v\phi[0:n]$ signal (composed of n signals, rather than a single signal). This edge information is used to generate a vote for one of the phases, which is accomplished by maintaining a count of the previous edge comparisons. The logic will first identify the local clock phase $\phi_n$, which is closest to the received edges and then increment the count for that phase. The length of the counter determines the period of the averaging window. The phase corresponding to the maximum count is dynamically picked (by MAX) as the estimate for the mean zero crossing. When the winning counter is about to overflow, the hardware will shift all counters by a certain number of bits. This ensures that a smooth moving average of the zero crossings is maintained, while retaining the winning phase.

Elastic Buffer

The elastic buffer 53 transfers data between two the tracking clock domain 57 and the local clock domain 58. The elastic buffer 53 is a commonly used logic device, often used in computers and communication systems, hence further description is not necessary herein. The elastic buffer 53 prevents overflow or underflow of data by providing a flag that indicates when data is ready to be transferred. It is the responsibility of the logic processing the data in the local clock domain 58 to pull data out at an average rate that matches the rate at which the data arrives.

The invention described herein can be employed between any two components communicating with each other, particularly doing so at high speed and using serial data. Referring to FIGS. 12a–d, examples of possible applications include, but are not limited to, server to server communications (such as modules MOD A 144 and MOD B 145 in FIG. 12c, in which the modules represent servers), distributed network communications (as shown by networked computers 141 and 142 in FIG. 12b connected via a distributed network 143, such as the Internet), local area network (LAN) communications (as shown by PCs A 146, B 148 and C 147 coupled by a LAN in FIG. 12d) component to component communication within a computer or computer system, such as a server or personal computer, as shown by CPU 136, modem 138, CD-ROM 139, disk drive 140 and secondary CPU 137 in FIG. 12a, which may be connected by legacy I/O or an I/O fabric) router to router communications (as shown by modules MOD A 144 and MOD B 145 in FIG. 12c, in which case the modules are routers), and communications between telephone switches and multiplexers, both optical and electrical (as shown by modules A 144 and B 145 in FIG. 12c, in which case the modules are telephone switches and/or multiplexers). Moreover, any communications in a modularized computer system can be performed using the method and apparatus described herein.

SBD Conversion Circuit

An aspect of the invention provides an electronic circuit to operate in conjunction with a digital receiver, such as the above-described edge-based receiver, which circuit permits the receiver to operate as a differential, simultaneous bi-directional (SBD) receiver.

The embodiments of the invention include inter alia a method and apparatus for converting a receiver from unidirectional signaling mode to differential simultaneous bi-directional signaling mode. According to an exemplary embodiment, an electrical circuit is interposed between a transmitter and an edge-based receiver. The electrical circuit provides functionality, by which the edge-based receiver is capable of operation as a differential simultaneous bi-directional receiver. The electrical circuit implemented between the transmitter and edge-based receiver acts as a voltage/current subtraction circuit. Generally, when signaling over cables or other media with significant return impedance, it is more efficient to use two conductors to carry two simultaneous bi-directional signals differentially.

Accordingly, embodiments of the invention include a method, system and apparatus for effectively increasing the bandwidth on a pair of wires used in data communications. Moreover, differential simultaneous bi-directional signaling is achieved without the need to precisely maintain a plurality of threshold voltages.

The embodiments of the invention provide a technique for differential simultaneous bi-directional signaling in an edge-based receiver by the implementation of a simple electronic circuit between a transmitter and the edge-based receiver.

Figure 13:
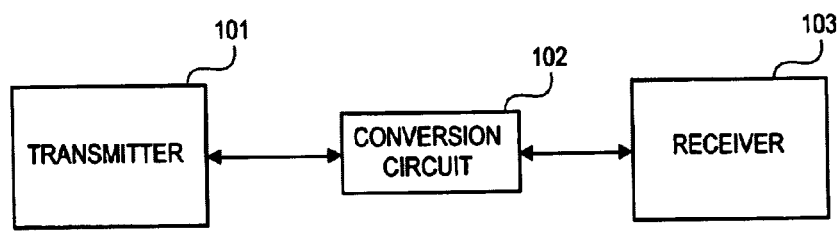
FIG. 13 depicts a block diagram of an exemplary embodiment of an edge-based receiver operating in conjunction with a circuit in accordance with one aspect of the invention.

Referring now in detail to the various drawings, there is shown in FIG. 13 a block diagram of an exemplary embodiment of an edge-based receiver operating in conjunction with a conversion circuit in accordance with one aspect of the invention. A transmitter 101 that has a current mode driver with a high impedance output and dual end termination (both the transmitter and receiver sides) is operatively connected to a conversion circuit 102 and an edge-based receiver 103. The conversion circuit 102 converts the signaling between the transmitter 101 and the edge-based receiver 103 from unidirectional signaling to differential simultaneous bi-directional signaling.

Figure 14:
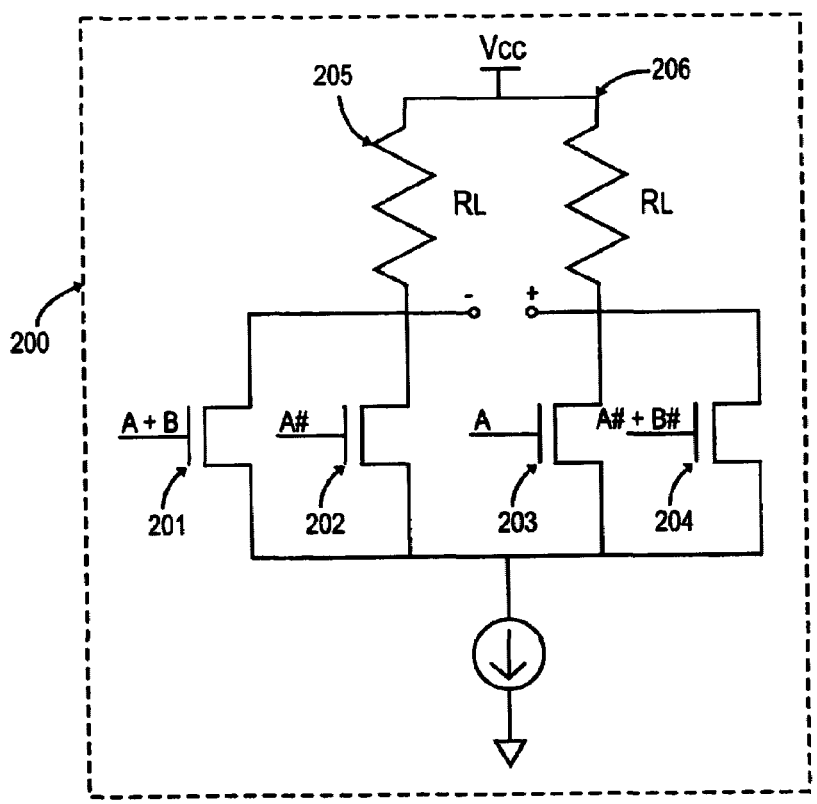
FIG. 14 depicts a conversion circuit for permitting simultaneous, bi-directional communications in an edge-based receiver in accordance with another aspect of the invention.

As shown in more detail in FIG. 14, the conversion circuit 102, which is shown in FIG. 13 and again as circuit 200, comprises two coupled differential pairs. The differential pairs are comprised of current sources 201 and 202 operating as a first differential pair and current sources 203 and 204 operating as a second differential pair. Each pair converts a differential voltage into a differential current. The differential pairs are coupled on the receiver side and in this scheme, differential voltages A and A# come from the transmitter on the source side and B and B# come from the receiver. Current for the circuit shown in FIG. 14 is provided by current source 207. Current from the first differential pair flows through resistor 205 and current from the second differential pair flows through resistor 206. The drains of the two pairs are tied together to sum these two currents to yield a single differential load current and output voltage (−, +). In this manner the conversion circuit acts as a voltage/current subtract circuit. The coupling on the receiver side, of the differential pairs of the conversion circuit 200, further ensures that the safe operating voltage of the receiver is not exceeded. Without the coupling of the differential pairs, the safe operating voltage of the input transistors could be exceeded.

For example, assuming that the safe operating voltage of the input transistors of the receiver, $V_{cc}$ is 1.5V, and that voltages A and A# come from the transmitter on the source side and voltages B and B# come from the receiver. For a $V_{cc}$ of 1.5 V, voltage A could swing 1.0V to 0.5 V and A# could swing 0.5V to 1.0V. Voltages B and B# could swing by the same margin for a net swing of 2.0V to 0.0V. For a CMOS device with a $V_{cc}$ of 1.5V, a net voltage of 2.0V is far too great. FIG. 15 shows a chart that tabulates voltages consistent with the example outlined above. The chart lists a set of possible input voltages listed as columns A, A#, B and B#. The sum of A an B and the sum of A# and B# are also listed followed by a column with the heading "High Out". Listed under this heading are the outputs (+, −) that are higher for the inputs listed in that row.

By coupling the differential pairs, voltage independence is maintained and the safe operating voltage of the input transistors is not exceeded. Other simultaneous bi-directional schemes use two threshold voltages to subtract the currents or voltages. It is difficult, however, to create two precise threshold voltages that reject power-supply variations, process variations, and temperature variations. In these embodiments there is no need to create such threshold voltages.

In one embodiment, differential outputs (+, −) illustrated in FIG. 14 may be coupled to the differential inputs (D+, D−) illustrated in FIG. 5, such that the positive output of the differential outputs is coupled to the positive input of the differential inputs and the negative output of the differential outputs is coupled to the negative input of the differential inputs. In other embodiments, the differential outputs of FIG. 14 may be coupled to the differential inputs of FIG. 5 in a different manner or with intervening circuitry.

Figure 16:
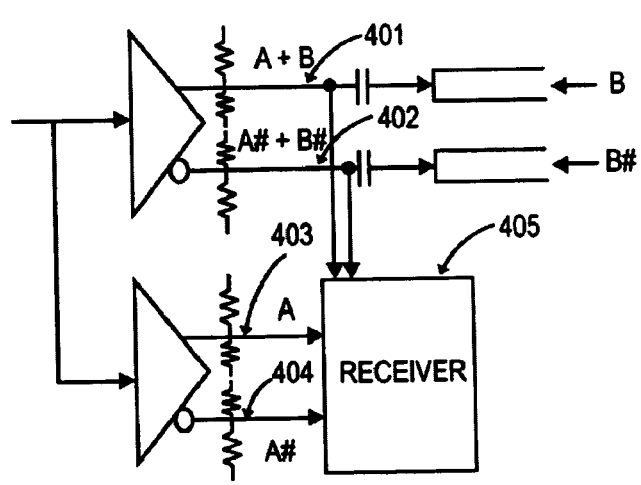
FIG. 16 is a logic diagram depicting operation of an exemplary embodiment of a circuit in conjunction with an edge-based receiver in accordance with the present invention.

Turning now to FIG. 16, a logic diagram is shown that details the operation of the conversion circuit in conjunction with an edge-based receiver. Here again, signals A and A# come from the transmitter on the source side and B and B# come from a portion of the receiver not shown in FIG. 16. A first differential pair comprised of current sources 401 and 402, and a second differential pair comprised of current sources 403 and 404 are coupled and summed at edge-based receiver 405, forming a voltage/current subtract circuit.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of four clock phases, other numbers (n) of clock phases will suffice, such as only two or more than four. In addition, while some of the above embodiments use a counter and a maximizer to determine a moving average of the phase of the edges, any technique for calculating the moving average will suffice. Furthermore, while some of the above embodiments use differential coding, any coding scheme, or no coding, will suffice. These examples should not be interpreted to limit the modifications and variations of the invention covered by the claims but are merely illustrative of possible variations.

Moreover, all the features disclosed in this specification (including any accompanying claims, abstract and drawings) and/or all of the steps or any method or process so disclosed, may be combined in any combination, except combinations where at least some of the steps or features are mutually exclusive. Each feature disclosed in this specification (including any claims, abstract and drawings) may be replaced by alternative features serving the same equivalent or similar purpose, unless expressly stated otherwise. Thus unless expressly stated otherwise, each feature disclosed is one example only of a generic series of equivalent or similar features.

What is claimed is:

1. An apparatus for receiving data comprising:
an edge processor to make decisions using a plurality of edges of a received data stream;
a communication circuit coupled to the edge processor to convert communications with the edge processor from a first format to a second format; and
a plurality of current sources coupled to the communication circuit, said current sources coupled to form differential pairs to convert a differential voltage corresponding to the communications to a differential current, each of the differential pairs being coupled to a resistor.

2. The apparatus according to claim 1, wherein said first format includes uni-directional signaling.

3. The apparatus according to claim 1, wherein the second format includes simultaneous bi-directional signaling.

4. The apparatus according to claim 3, wherein the first format includes unidirectional signaling.

5. The apparatus according to claim 1, wherein the second format includes differential simultaneous bi-directional signaling.

6. An apparatus comprising:
a first unit to convert a signal between a transmitter and an edge-based receiver from unidirectional signaling to differential simultaneous bi-directional signaling;
a plurality of current sources, said current sources coupled to the edge-based receiver to form differential pairs, said differential pairs operative to convert a plurality of differential voltages to a plurality of differential currents; and
a plurality of resistors coupled to each of the differential pairs to sum said differential currents to yield a single differential load.

7. The apparatus according to claim 6, wherein said plurality of differential voltages comprise a plurality of differential voltages from the transmitter and a plurality of differential voltages from the receiver, respectively.

8. The apparatus according to claim 1, wherein differential voltages are less than the safe operating voltage of said receiver.

9. A system comprising:
a transmitter including a current mode driver, a high impedance output and a dual end termination;
an edge based receiver coupled to the transmitter including an edge processor operative to make decisions using a plurality of edges of a received data stream;
a conversion circuit coupled to the edge based receiver to convert signaling between the transmitter and the receiver from a first format to a second format;
a plurality of current sources coupled to the conversion circuit to convert a plurality of differential voltages to a plurality of differential currents; and
a plurality of resistors to sum said plurality of differential currents in order to yield a single differential load.

10. The system according to claim 9, wherein said first format includes unidirectional signaling.

11. The system according to claim 9, wherein said second format includes simultaneous bi-directional signaling.

12. The system according to claim 9, wherein said second format includes differential simultaneous bi-directional signaling.

13. The system according to claim 12, wherein said first format includes unidirectional signaling.

14. The system according to claim 13, wherein said conversion circuit operates as a voltage/current subtraction circuit.

15. The system according to claim 13, wherein said conversion circuit further comprises:
the plurality of current sources coupled to the edge-based receiver to form a plurality of differential pairs, said plurality of differential pairs operative to convert the plurality of differential voltages to the plurality of differential currents; and
the plurality of resistors coupled to each of the plurality of differential pairs to sum said plurality of differential currents to yield the single differential load.

16. A method comprising:
creating a plurality of differential pairs;
converting a plurality of differential voltages in said plurality of differential pairs to a plurality of differential currents:
coupling the plurality of differential currents to an edge-based receiver; and
summing the plurality of differential currents to yield a single differential load.

17. The method according to claim 16, wherein the plurality of differential voltages comprise a plurality of differential voltages from the transmitter and a plurality of differential voltages from the edge-based receiver, respectively.

18. The method according to claim 17, wherein the edge-based receiver comprises an edge processor operative to make decisions using a plurality of edges of a received data stream.

19. A computer readable media having encoded thereon instructions causing a processor to convert a signaling format between a transmitter and an edge-based receiver by:
creating a plurality of differential pairs;
converting a plurality of differential voltages in said plurality of differential pairs to a plurality of differential currents;
coupling the plurality of differential currents to the edge-based receiver; and
summing the plurality of differential currents to yield a single differential load.

20. The computer readable media according to claim 19, wherein the plurality of differential voltages comprise a plurality of differential voltages from the transmitter and a plurality of differential voltages from the edge-based receiver, respectively.

21. The computer readable media according to claim 20, wherein the edge-based receiver comprises an edge processor operative to make decisions using a plurality of edges of a received data stream.

* * * * *

UNITED STATES PATENT AND TRADEMARK OFFICE
CERTIFICATE OF CORRECTION

PATENT NO. : 7,054,374 B1
APPLICATION NO. : 09/752813
DATED : May 30, 2006
INVENTOR(S) : Jensen et al.

It is certified that error appears in the above-identified patent and that said Letters Patent is hereby corrected as shown below:

Column 4, at line 45, delete "Is" and insert --I s--.
Column 9, at line 50, delete "O's" and insert --'0's--.

Signed and Sealed this

Third Day of June, 2008

JON W. DUDAS
*Director of the United States Patent and Trademark Office*